United States Patent
Ostrozynski

[11] 3,906,018
[45] Sept. 16, 1975

[54] POLYSILOXANE CARBAMATE COMPOUNDS

[75] Inventor: Robert Leopold Ostrozynski, Mahopac, N.Y.

[73] Assignee: Union Carbide Corporation, New York, N.Y.

[22] Filed: May 10, 1972

[21] Appl. No.: 252,331

[52] U.S. Cl. ............... 260/448.2 N; 260/448.2 E
[51] Int. Cl.² ............................... C07F 7/10
[58] Field of Search ................ 260/448.2 N

[56] References Cited
UNITED STATES PATENTS

| | | | |
|---|---|---|---|
| 2,973,383 | 2/1961 | Black | 260/448.2 N |
| 3,012,052 | 12/1961 | Simmler | 260/448.2 R |
| 3,042,657 | 7/1962 | Dodgson | 260/448.2 N X |
| 3,284,485 | 11/1966 | Goossens | 260/448.2 N X |
| 3,404,168 | 10/1968 | Simmler et al. | 260/448.2 N |
| 3,541,031 | 11/1970 | Boudreau | 260/448.2 N X |
| 3,629,196 | 12/1971 | Hahn et al. | 260/448.2 N X |
| 3,652,629 | 3/1972 | Fort | 260/448.2 N |
| 3,658,864 | 4/1972 | Golitz et al. | 260/448.2 N |
| 3,673,233 | 6/1972 | Golitz et al. | 260/448.2 N |
| 3,726,943 | 4/1973 | Joy | 260/448.2 N X |
| 3,816,359 | 6/1974 | Creamer | 260/448.2 N X |

*Primary Examiner*—Paul F. Shaver
*Attorney, Agent, or Firm*—R. J. Finnegan

[57] ABSTRACT

An organopolysiloxane polymer free from hydroxyl radicals, which contains at least one carbamate radical having the formula

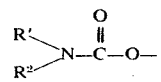

wherein $R^1$ is hydrogen or a monovalent hydrocarbon radical; $R^2$ is a monovalent hydrocarbon radical, all carbamate radicals of said polymer being directly bonded to a terminal silicon atom of said polymer; said polymers are useful as protective coatings to render materials water-repellant and as intermediates in preparing siloxane fluids and oils.

6 Claims, No Drawings

POLYSILOXANE CARBAMATE COMPOUNDS

This invention relates to novel organosilicon compounds and more particularly to novel N,N-diorganocarbamate substituted polysiloxane compounds.

While the prior art, e.g., German Pat. No. 1,157,226 and U.S. Pat. Nos. 3,284,485 and 3,364,175, has disclosed certain monomeric silyl carbamates, that is N,N-diorganocarbamate silanes, it has been silent with regard to polymeric siloxane carbamates.

Thus it is an object of this invention to provide N,N-diorganocarbamate substituted polysiloxane polymer compounds. Other objects and advantages of this invention will become readily apparent from the following description and claims.

The novel N,N-diorganocarbamate substituted polysiloxane compounds of this invention include any organosilicon polymer free from hydroxyl radicals and containing at least one N,N-diorganocarbamate radical of the formula

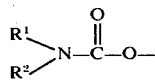

wherein $R^1$ is hydrogen or a monovalent hydrocarbon radical and wherein $R^2$ is a monovalent hydrocarbon radical, all carbamate radicals of said polymers being directly bonded to a terminal silicon atom of said polymer.

The most preferred organopolysiloxane carbamates are essentially linear polymers having the average formula (I) $X(R)_2SiO[(R)_2SiO]_pSi(R)_2X$ wherein $p$ has an average value of 0 to 1000; where R is hydrogen or a monovalent hydrocarbon radical and more preferably a lower alkyl radical, especially methyl, and wherein X is the N,N-diorganocarbamate radical, $R^1R^2NCOO$— as defined above, preferably a diloweralkylcarbamate radical, especially dimethylcarbamate.

It is to be understood that while said polymers can be discrete chemical compounds they are usually mixtures of various discrete polymer species due at least in part to the fact that the siloxamine starting materials used to produce the siloxane carbamates of this invention are themselves usually mixtures.

Illustrative of the monovalent hydrocarbon groups that may be represented by R, in the above formula are alkyl groups (such as, methyl, ethyl, propyl, isopropyl, butyl, pentyl, hexyl, octyl, decyl, dodecyl, octadecyl, eicosyl, and the like); aryl groups (such as phenyl, naphthyl, and the like); alkenyl groups (such as vinyl, allyl and the like); cycloalkenyl groups (such as cyclohexenyl and the like); aralkyl groups (such as benzyl, phenylethyl, and the like); alkaryl groups (such as tolyl, xylyl and the like); and cycloalkyl groups (such as cyclohexyl and the like). If desired such groups can be substituted with substituents such as cyano, nitro, halogen, alkoxy etc. Examples of such substituted groups are cyanoalkyl e.g. beta-cyanoethyl; nitroaryl e.g. nitrophenyl; haloalkyl, e.g. chloropropyl, chloroethyl, trifluoropropyl; halophenyl, e.g. bromophenyl; alkoxyalkyl, e.g., methoxyethyl, methoxypropyl, propoxyethyl; propyloxypropyl; and the like. PreferablY said R, radicals contain from 1 to 20 carbon atoms. Most preferably they are unsubstituted monovalent hydrocarbon radicals, while lower alkyl and phenyl radicals are most preferred, especially methyl.

Illustrative of the monovalent hydrocarbon radicals that may be represented by $R^1$ and $R^2$ above are the saturated unsubstituted and substituted monovalent radicals as defined for R above. similarly the most preferred $R^1$ and $R^2$ radicals are lower alkyl radicals which can be the same or different, although the most preferred diorganocarbamate radical is demethylcarbamate.

The organopolysiloxane carbamate compounds of the instant invention can be prepared from N,N-diorganoamino substituted polysiloxane compounds, hereinafter also referred to as organopolysiloxamines. More specifically the process involves converting the precursor organopolysiloxamines to the corresponding organopolysiloxane carbamates of the instant invention by reaction with carbon dioxide as illustrated by the following skeletal equation.

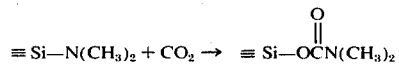

wherein $\equiv Si-N(CH_3)_2$ represents a dimethylamino substituted organopolysiloxane compound and

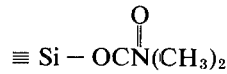

represents the desired corresponding N,N-dimethylcarbonate substituted organopolysiloxane product.

Accordingly, since the reaction is directed to conversion of the amino group to a carbamate group it is elementary that the choice of the organopolysiloxamine starting material merely depends on the particular organopolysiloxane carbamate desired to be produced. Of course it is to be understood that the organopolysiloxamine starting material can be an individual compound, a mixture of polymers of the same class and type or a mixture of polymers of different classes and types. Thus any organosilicon polymer free from hydroxyl radicals containing terminal N,N-diorganoamino radicals of the formula $R^1R^2N$— wherein $R^1$ and $R^2$ are the same as defined above can be employed. More particularly the organopolysiloxamine starting materials are preferably those essentially linear polymers having the average formula $Y(R)_2SiO[(R)_2SiO]_pSi(R)_2Y$ wherein $p$, and are the same as defined above and Y is $-NR^1R^2$.

Such organopolysiloxamine precursors and/or methods for their preparation are well known in the art as witnessed for example by U.S. Pat. Nos. 3,467,686; 3,530,092; 3,535,357, and 3,519,601, the disclosures of which are incorporated herein by reference thereto.

The instant process for preparing the organopolysiloxane carbamates of this invention is not narrowly critical and is preferably conducted under anhydrous conditions at ambient temperatures and pressures although autogeneous pressures at temperatures from −25°C. to about 200°C. may be used, if desired. The absence of hydroxyl radicals on the organopolysiloxamine starting materials and the anhydrous conditions are desired so as to prevent possible side reactions.

The amount of carbon dioxide employed is not narrowly critical and merely depends on whether it is desired to react all or only some of the diorganoaminosilicon bonds in the organopolysiloxamine starting material. For example, theoretically one mole of carbon dioxide will convert one mole of diorganoamine group to one mole of the diorganocarbamate radical. Accordingly one need only employ that amount of carbon dioxide that is at least about stoichiometrically equivalent to the amount or number of Si—NR$^1$R$^2$ bonds desired to be reacted. Of course, amounts that are less or in excess of said stoichiometric equivalent may be used if desired. In general it is preferred to employ a stoichiometric excess of carbon dioxide to insure conversion of all of the diorganoamino groups to diorganocarbamate radicals.

The reaction process affords an easy and speedy method for preparing the desired organopolysiloxane carbamates. There is no by-product to contend with. The desired organopolysiloxane carbamate product is normally a fluid and recoverable by any suitable conventional method. The amount of carbon dioxide desired to be reacted can be controlled and the completion of the reaction easily determined by monitoring the temperature of the reaction, since the reaction is exothermic, the peak point of said exotherm and subsequent drop in temperature signifying completion of the reaction. Alternatively the molecular weight of the organopolysiloxane carbamate product can be monitored until which time it becomes constant signifying no further reaction of amine and carbon dioxide, thus completion of the process. Accordingly in addition to employing a stoichiometric deficiency of carbon dioxide to product products containing both diorganoamino and diorganocarbamate radicals, alternatively, if desired, one need only stop the preferred reaction from going to completion to achieve the same result. Moreover, while solvent diluents or catalysts are not needed in the instant process the use of minor amounts of solvents, such as conventional hydrocarbon solvents, like toluene, xylene, paraffin oil and the like, and/or catalysts, such as conventional platinum catalysts and the like, may be employed if desired.

The novel organopolysiloxane carbamates of the instant invention are highly useful in the production of a multitude of polymeric siloxane products. Said carbamates can be reacted with hydroxyl containing substances, e.g. water, alcohols, hydroxy substituted silicon compounds, and the like, to produce a wide variety of silicone polymers, e.g. siloxane fluids, oils etc. Such silicone polymer products of course can be used in the same areas and for the same purposes as those of conventionally known silicon compounds.

The following examples are illustrative of the present invention and are not to be regarded as limitative. It is to be understood that all parts, percentages and proportions referred to herein and in the appended claims are by weight unless otherwise indicated. As used herein Me represents a methyl radical.

EXAMPLE 1

A stream of dry $CO_2$—$N_2$ was bubbled for two hours at ambient temperature through 103.8 grams of a linear polysiloxane having the formula Me$_2$N(Me$_2$SiO)$_4$Si(Me$_2$)NMe$_2$ contained in a glass reaction vessel. A mild exotherm, 23° to 50°C., was noted during the CO$_2$ addition period. At the end of the reaction period, about 121.1 grams of the desired liquid siloxane carbamate polymer product having the formula Me$_2$NCOO(Me$_2$SiO)$_4$Si(Me$_2$)OOCNMe$_2$ was recovered and confirmed by analysis of the infrared absorption spectrum of the product.

EXAMPLE 2

Following the procedure described above and by varying the choice of silicon-nitrogen polymer starting materials other polysiloxane-carbamate polymers may be prepared which correspond to the choice of said starting materials, such as Me$_2$NCOO(Me$_2$)SiOSi(Me$_2$)OOCNMe$_2$ Me$_2$NCOO(Me$_2$)SiO(Me$_2$SiO)$_9$Si(Me$_2$)OOCNMe$_2$ Me$_2$NCOO(Me$_2$)SiO(Me$_2$SiO)Si(Me$_2$)OOCNMe$_2$ Me$_2$NCOO(Me$_2$)SiO(Me$_2$SiO)$_{1000}$Si(Me$_2$)OOCNMe$_2$ The compounds of this invention are also useful as protective coatings in the treatment of cellulosic materials such as textiles and paper, and glass surfaces to provide water-repellant qualities, and in the treatment of rubber, plastic and ceramic insulations to prevent arc-over under humid conditions, and in the treatment of masonry, concrete and ceramic surfaces to reduce water absorption and spalling, and in the treatment of silica fillers to render said fillers hydrophobic.

Various modifications and variations of this invention will be obvious to a worker skilled in the art and it is understood that such modifications and variations are to be included within the purview and scope of this application and the spirit and scope of the appended claims.

What is claimed is:

1. An essentially linear organopolysiloxane polymer, free from hydroxyl radicals which contains at least one N,N-diorganocarbamate radical of the formula $$\begin{array}{c} R^1 \\ \phantom{R^1} \diagdown \\ \phantom{R^1R^1} N-\overset{\overset{\displaystyle O}{\|}}{C}-O- \\ \phantom{R^1} \diagup \\ R^2 \end{array}$$

wherein R' is hydrogen or a monovalent hydrocarbon radical and wherein R$^2$ is a monovalent hydrocarbon radical, all carbamate radicals of said polymer being directly bonded to a terminal silicon atom of said polymer and wherein the other substituent radicals directly bonded to the silicon atoms of said organopolysiloxane polymer are selected from the group consisting of hydrogen, monovalent hydrocarbon radicals and substituted monovalent hydrocarbon radicals wherein the substitutents are selected from the class consisting of halogen, nitro, cyano and alkoxy radicals.

2. An organopolysiloxane polymer as defined in claim 1 wherein R$^1$ and R$^2$ are methyl radicals.

3. An organosilicon polymer as defined in claim 1, having the average formula

R'R$^2$NCOO(R)$_2$SiO[(R)$_2$SiO]$_p$Si(R)$_2$OOCNR'R$^2$ wherein R is a radical selected from the group consisting of hydrogen, monovalent hydrocarbon radicals and substituted monovalent hydrocarbon radicals wherein the substituents are selected from the class consisting of halogen, nitro, cyano and alkoxy radicals, and wherein $p$ has an average value of 0 to 1000.

4. An essentially linear organopolysiloxane polymer as defined in claim 3 wherein $R^1$ and $R^2$ are lower alkyl radicals and wherein R is a monovalent hydrocarbon radical.

5. An organopolysiloxane polymer as defined in claim 4, wherein $R^1$ and $R^2$ are methyl radicals; wherein R is a lower alkyl radical and wherein p has a value of at least 4.

6. An organopolysiloxane polymer as defined in claim 5, wherein R is a methyl radical.

* * * * *

UNITED STATES PATENT OFFICE
CERTIFICATE OF CORRECTION

Patent No. 3,906,018　　　　Dated September 16, 1975

Inventor(s) R. L. Ostrozynski

It is certified that error appears in the above-identified patent and that said Letters Patent are hereby corrected as shown below:

Line 4 of the ABSTRACT, that portion of the formula shown as "R'" should be ---$R^1$---.

Column 1, last line, "PreferablY" should be ---Preferably---.

Column 2, line 29, that portion of the formula "≡Si" should be ---≡Si---.

Column 2, line 52, before "are" insert ---R---.

Column 3, line 34, "product" should be ---produce---.

Column 4, line 44 (claim 1, line 4) and column 4, line 48 (claim 1, line 5) the symbol "R'" each occurrence should be ---$R^1$---.

Column 4, line 63 (claim 3, line 3) the two "R'" symbols appearing in the formula should both be ---$R^1$---.

Signed and Sealed this tenth Day of February 1976

[SEAL]

Attest:

RUTH C. MASON
*Attesting Officer*

C. MARSHALL DANN
*Commissioner of Patents and Trademarks*